O. HUSSEY.
Method of Discharging Grain.
No. 22,368.
2 Sheets—Sheet 1.
Patented Dec. 21, 1858.
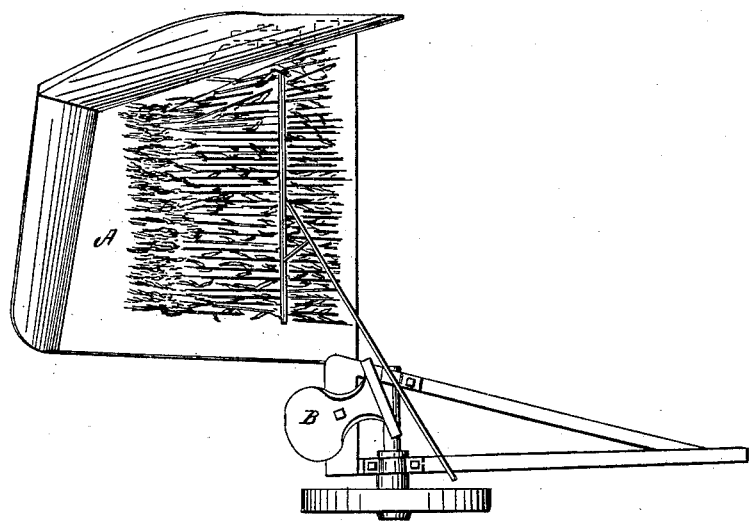
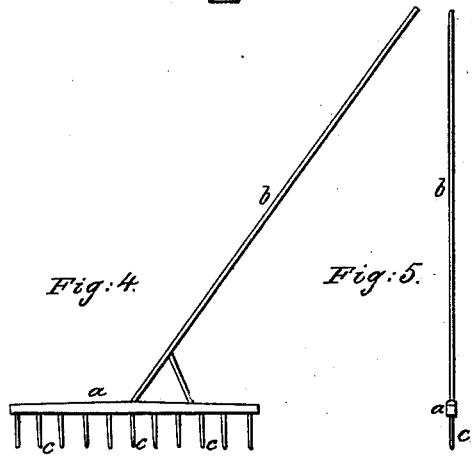 

O. HUSSEY.
Method of Discharging Grain.
No. 22,368.
2 Sheets—Sheet 2
Patented Dec. 21, 1858.
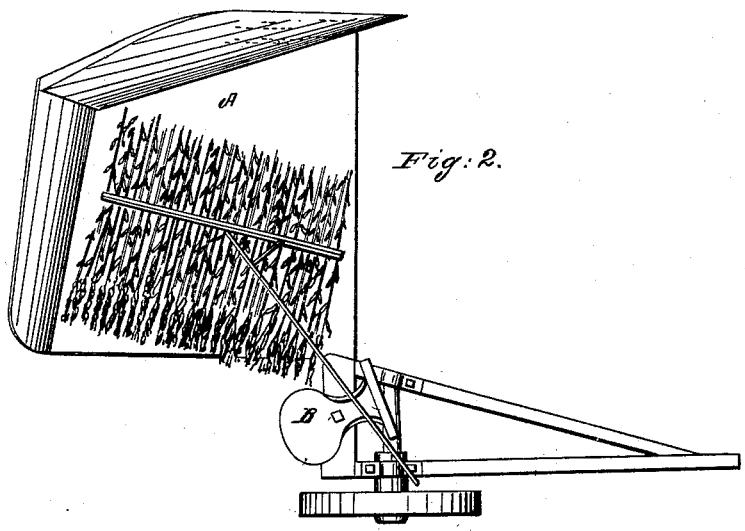
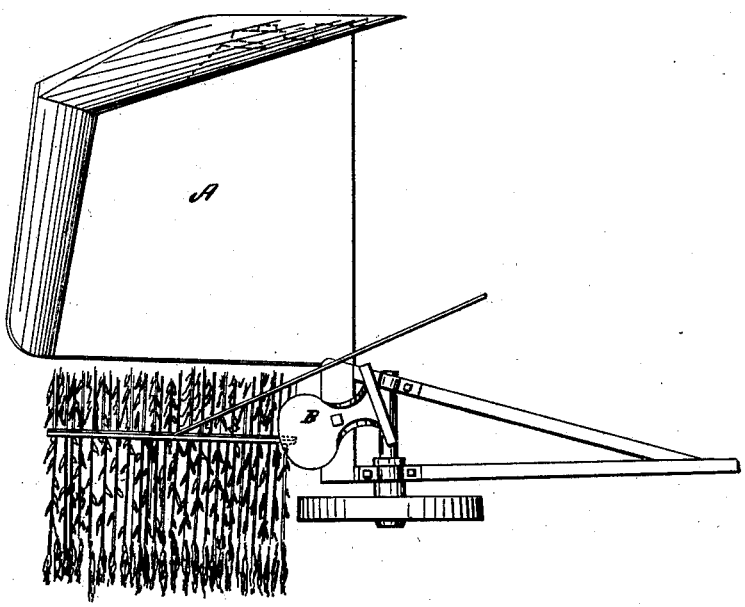

UNITED STATES PATENT OFFICE.

O. HUSSEY, OF BALTIMORE, MARYLAND.

IMPROVED METHOD OF GATHERING GRAIN UPON AND DISCHARGING IT FROM THE PLATFORMS OF HARVESTERS.

Specification forming part of Letters Patent No. 22,368, dated December 21, 1858.

*To all whom it may concern:*

Be it known that I, OBED HUSSEY, of the city and county of Baltimore, in the State of Maryland, have invented a new and useful method of Discharging Grain from the Platforms of Harvesting-Machines, of which the following is a full, clear, and exact description, reference being had to the accompanying drawings, making part of this specification, in which—

Figure 1 represents a plan or top view of so much of a harvesting-machine as is necessary to illustrate my invention, showing the position of the rake after the gavel has been gathered by it upon the platform, and when its teeth are inserted among the stalks of the grain preparatory to turning it. Fig. 2 represents a similar view of the same, showing the position of the rake just after being turned. Fig. 3 represents a similar view of the same, showing the position of the rake just after effecting the discharge of the grain. Fig. 4 represents a side view of the rake, showing the manner in which it is attached to its handle; and Fig. 5 represents an edge view of the same, showing the handle of the rake in the same plane with its head.

The discharge of the cut grain by hand from the platform of a harvesting-machine has heretofore usually been accomplished in one of four ways—viz., first, by inserting the teeth of a rake (the head of which is equal, or thereabout, in length to the width of the swath cut) into the grain as it lies upon the platform, and pushing or drawing the grain endwise directly back onto the ground in the wake or track of the machine; secondly, by means of a fork or a rake with a short head, pushing or drawing the grain sidewise off the platform of the machine and discharging it at the side of the machine, where it will be out of the path of the horses in cutting the next succeeding swath; thirdly, by means of a rake like that used in the first-named method, with which the grain is swept endwise continuously round an arc of about ninety degrees of a circle, and then discharged off the side of the platform onto the ground immediately behind the horses; and, fourthly, by the raker (from a position in rear of the platform and directly behind the grain lying thereon) inserting the teeth of his rake or fork into the fallen grain, turning it by a pivotal movement of the rake until its stalks are parallel to the cutter, and discharging it endwise onto the ground into a space between the side of the platform and the driving-wheel.

The first of the above-named methods is objectionable for the reason that it leaves the gavels of grain in the path of the horses when they come round on the next succeeding swath, which necessitates the removal of the gavels before the return of the machine.

The second method is objectionable because that portion of the gavel which first passes over the side of the platform reaches the ground and becomes stationary while a part is yet on the platform and being carried forward with the machine, which causes much scattering and consequent waste, to lessen which, as far as practicable, it is usual to draw or push off the grain by a very rapid motion, which renders the labor of raking very severe.

The third method is objectionable because to sweep the grain round so far by a continuous pull strains particular muscles of the raker to a degree that renders his labor exceedingly severe and irksome.

The fourth method is objectionable inasmuch as the raker is compelled to work in a disadvantageous position, as he must, in this position, first draw a portion of the grain toward him, and then push it from him at the same time that he is turning it upon the platform, in order to get it into the proper position for being discharged. The grain is then discharged by pushing it endwise off the side of the platform, all of which operations are irksome and fatiguing from the posture of the raker, which compels him to work and strain his muscles in directions in which they are not accustomed to sustain strains, and in which they are not the strongest. The raker must necessarily occupy the position above indicated when a reel is used upon any machine on which this method of discharge is attempted, as the reel would interfere with the proper manipulation of the rake from any point on or near the front of the platform.

The object of my invention is to combine the advantages of the above-mentioned methods and avoid their defects; and my improvement consists in a new method of manipulating the grain with a rake, whereby the grain is discharged from a harvesting-machine in an even gavel and with comparatively little fatigue to the raker. I am also enabled to dispense with the use of a reel, as its functions are performed by the raker in gathering the grain onto the platform. In raking the grain by my improved method the raker occupies a stand or position, B, on the front and outer end of the platform A, and directly behind the horses and the gearing, with his face turned obliquely toward the grain to be cut, and inserts his rake into the standing grain (at such a distance in advance of the cutter as to include a quantity sufficient, when cut, to form a gavel) and draws it back against the cutter, which severs it, when it falls upon the platform. The raker, still facing obliquely forward, then turns the prostrate grain upon the platform by a pivotal movement of the head of his rake, until the stalks are parallel, or nearly so, to the cutter, and then by a quick pull slides the grain endwise and heads foremost onto the ground directly behind the raker's position and in the track of the driving-wheel.

This new method of operation, by which the grain is first turned on the middle of the platform and then slid off endwise, is much less fatiguing to the muscles of the raker than any other method of operation heretofore devised. Rakes or forks of various forms may be employed for this purpose; but I prefer one such as has heretofore commonly been used with my machines, the head of which is about equal in length to the width of the swath cut, and whose handle is inserted into the head diagonally and opposite to the teeth, but in the same plane with them, as shown in Figs. 4 and 5, in which $a$ is the head, $b$ the handle, and $c$ the teeth.

What I claim as my invention, and desire to secure by Letters Patent, is—

The method herein described of gathering grain upon and raking it from the platform of a reaping-machine and depositing it upon the ground by a raker riding on the machine directly behind the horses and the gearing, facing obliquely toward the grain which the machine is advancing to cut, and who, at a single operation with his rake, first presses the grain in front of the machine backward against the cutter and over upon the platform; secondly, by a pivotal motion turns the prostrate grain upon the platform, with its stalks parallel to the cutter; thirdly, slides the grain endwise off the platform at the side of the machine, and, fourthly, deposits the grain in a gavel on the ground behind his seat and across the track of the driving-wheel of the machine, as herein set forth.

In testimony whereof I have hereunto subscribed my name.

OBED HUSSEY.

Witnesses:
SAMUEL T. PROCTER,
EDWARD M. PRICE.